(12) United States Patent
Hwang et al.

(10) Patent No.: US 9,344,236 B2
(45) Date of Patent: May 17, 2016

(54) APPARATUS AND METHOD OF PERFORMING CHANNEL ESTIMATION IN A WIRELESS COMMUNICATION SYSTEM

(71) Applicant: Samsung Electronics Co., Ltd., Suwon-si, Gyeonggi-do (KR)

(72) Inventors: Sang-Yun Hwang, Suwon-si (KR); Hwan-Min Park, Changwon-si (KR); Jeong-Soon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 135 days.

(21) Appl. No.: 14/199,309

(22) Filed: Mar. 6, 2014

(65) Prior Publication Data

US 2014/0286207 A1 Sep. 25, 2014

(30) Foreign Application Priority Data

Mar. 19, 2013 (KR) .................. 10-2013-0028948

(51) Int. Cl.
| | | |
|---|---|---|
| *H04L 25/02* | (2006.01) | |
| *H04L 5/00* | (2006.01) | |
| *H04L 5/14* | (2006.01) | |
| *H04B 1/7105* | (2011.01) | |
| *H04B 1/7107* | (2011.01) | |

(52) U.S. Cl.
CPC ............ *H04L 5/0037* (2013.01); *H04B 1/7105* (2013.01); *H04L 5/14* (2013.01); *H04L 25/0204* (2013.01); *H04L 25/0208* (2013.01); *H04B 1/7107* (2013.01); *H04L 5/0073* (2013.01); *H04L 25/0212* (2013.01)

(58) Field of Classification Search
CPC .. H04B 1/7105; H04B 1/7107; H04B 7/0413; H04L 25/0202; H04L 5/0073; H04L 25/0204; H04L 25/0208; H04L 25/0212
See application file for complete search history.

(56) References Cited

U.S. PATENT DOCUMENTS

| | | | | |
|---|---|---|---|---|
| 2003/0053436 A1* | 3/2003 | Li | ................ | H04B 1/7105 370/342 |
| 2010/0232534 A1* | 9/2010 | Lee | ................ | H04B 7/043 375/267 |
| 2012/0093200 A1* | 4/2012 | Kyeong | ................ | H04B 1/711 375/144 |
| 2012/0178381 A1* | 7/2012 | Jiang | ................ | H04B 7/0617 455/69 |
| 2014/0112250 A1* | 4/2014 | Bahrenburg | ................ | H04B 1/7083 370/328 |
| 2014/0226600 A1* | 8/2014 | Tang | ................ | H04B 1/7107 370/329 |
| 2015/0092875 A1* | 4/2015 | Kim | ................ | H04B 7/0478 375/267 |

* cited by examiner

*Primary Examiner* — Raj Jain
(74) *Attorney, Agent, or Firm* — Jefferson IP Law, LLP

(57) ABSTRACT

A method and apparatus of performing channel estimation in a wireless communication system are provided. The method includes determining a channel response value of a midamble sequence included in a downlink slot, detecting a first channel response value of a window allocated to a user and a second channel response value of a window allocated to at least one other user based on the channel response value of the midamble sequence, determining whether a Base Station (BS) of a current cell uses beamforming based on the first and second channel response values, and combining the first and second channel response values and using the combined channel response value for signal detection if it is determined that the BS does not use beamforming.

16 Claims, 7 Drawing Sheets

APPARATUS AND METHOD OF PERFORMING CHANNEL ESTIMATION IN A WIRELESS COMMUNICATION SYSTEM

CROSS-REFERENCE TO RELATED APPLICATIONS

This application claims the benefit under 35 U.S.C. §119(a) of a Korean patent application filed on Mar. 19, 2013 in the Korean Intellectual Property Office and assigned Serial No. 10-2013-0028948, the entire disclosure of which is hereby incorporated by reference.

BACKGROUND OF THE INVENTION

1. Field of the Invention

The present invention relates to channel estimation in a wireless communication system. More particularly, the present invention relates to a method and apparatus of performing channel estimation in a Time Division-Synchronous Code Division Multiple Access (TD-SCDMA) system.

2. Description of the Related Art

TD-SCDMA is a mobile telephone standard that combines Time Division Duplexing (TDD) with Code Division Multiple Access (CDMA). In TD-SCDMA, Base Stations (BSs) operate in synchronization with one another. TD-SCDMA was deployed in China and is used mainly for voice calls and data communication having low data rates. TD-SCDMA is characterized by the use of smart antenna technology that focuses transmission energy to a user and a Joint Detector (JD).

Smart antenna technology can provide an enhanced data transmission service to users by minimizing interference using beamforming. A JD is a kind of block equalizer that equalizes received data on a data block basis. The TD-SCDMA system supports data fields in such a manner that the block equalizer may operate, thereby maximizing reception performance of the system. The performance of the JD depends strongly on the performance of a channel estimator. Therefore, channel estimation is very significant to the TD-SCDMA system.

Accordingly, there exists a need for developing a technique that improves channel estimation performance in a TD-SCMDA system supporting beamforming.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus of performing channel estimation in a wireless communication system.

Another aspect of the present invention is to provide a method and apparatus of performing channel estimation in a Time Division-Synchronous Code Division Multiple Access (TD-SCDMA) system supporting beamforming.

Another aspect of the present invention is to provide a method and apparatus of improving the channel estimation performance of a user using channel response values of other users in a wireless communication system.

Another aspect of the present invention is to provide a method and apparatus of determining whether a Base Station (BS) uses beamforming in a TD-SCDMA system.

In accordance with an aspect of the present invention, a channel estimation method in a wireless communication system is provided. The method includes determining a channel response value of a midamble sequence included in a downlink slot, detecting a first channel response value of a window allocated to a user and a second channel response value of a window allocated to at least one other user based on the channel response value of the midamble sequence, determining whether a BS of a current cell uses beamforming based on the first and second channel response values, and combining the first and second channel response values and using the combined channel response value for signal detection if it is determined that the BS does not use beamforming.

In accordance with another aspect of the present invention, a channel estimation apparatus in a wireless communication system is provided. The apparatus includes a channel estimator configured to determine a channel response value of a midamble sequence included in a downlink slot, a window detector configured to detect a first channel response value of a window allocated to a user and a second channel response value of a window allocated to at least one other user based on the channel response value of the midamble sequence, a beamforming detector configured to determine whether a BS of a current cell uses beamforming based on the first and second channel response values, and a combiner configured to combine the first and second channel response values and use the combined channel response value for signal detection if it is determined that the BS does not use beamforming.

In accordance with another aspect of the present invention, a beamforming detection method in a wireless communication system is provided. The method includes detecting a first channel response value of a window allocated to a user and a second channel response value of a window allocated to at least one other user in a midamble sequence included in a downlink slot, determining a cross-correlation between the first and second channel response values, increasing a parameter indicating the number of non-beamformed slots by 1 if the cross-correlation is larger than a predetermined first threshold, determining that a BS of a current cell uses beamforming if the parameter is larger than a predetermined second threshold, and determining that the BS does not use beamforming if the parameter is equal to or less than the second threshold.

In accordance with another aspect of the present invention, a beamforming detection apparatus in a wireless communication system is provided. The apparatus includes a window detector configured to detect a first channel response value of a window allocated to a user and a second channel response value of a window allocated to at least one other user in a midamble sequence included in a downlink slot, and a beamforming detector configured to determine a cross-correlation between the first and second channel response values, to increase a parameter indicating the number of non-beamformed slots by 1 if the cross-correlation is larger than a predetermined first threshold, to determine that a BS of a current cell uses beamforming if the parameter is larger than a predetermined second threshold, and to determine that the BS does not use beamforming if the parameter is equal to or less than the second threshold.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following description will be provided to achieve exemplary technical aspects of the present invention. In the following description, defined entities may have the same or similar names as other entities known in the art. However, it is to be understood that the present invention is not limited in its application to a specific entity or system. That is, while exemplary embodiments of the present invention will be described in the context of a Time Division-Synchronous Code Division Multiple Access (TD-SCDMA) system, it is to be understood that the present invention is not limited to the specific system and its configuration. Thus, exemplary embodiments of the present invention can be implemented with the same or ready modifications in a wireless communication system having a similar channel structure.

Figure 1:
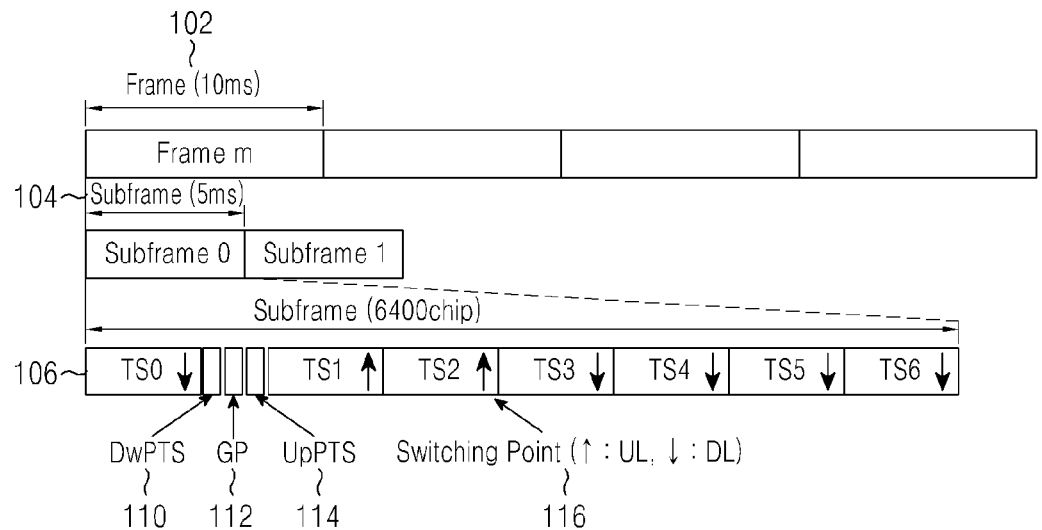
FIG. 1 illustrates a frame structure and a subframe structure in a Time Division-Synchronous Code Division Multiple Access (TD-SCDMA) system according to an exemplary embodiment of the present invention.

FIG. 1 illustrates a frame structure and a subframe structure in a TD-SCDMA system according to an exemplary embodiment of the present invention.

Referring to FIG. 1, a frame 102 is divided into two subframes 104, each including 7 Time Slots (TSs) 106. Each TS 106 is used to deliver a Downlink (DL) or Uplink (UL) signal in the TD-SCDMA system. In the illustrated case of FIG. 1, TSs TS0, TS3, TS4, TS5 and TS6 are DL TSs and TSs TS1 and TS2 are UL TSs. A time when a UL TS switches to a DL TS is called a switching point 116. The TS configuration of each subframe may be signaled by a Base Station (BS) or preset by the system. A Downlink Pilot Time Slot (DwPTS) 110 and an Uplink Pilot Time Slot (UpPTS) 114 are transmitted at specific positions in each subframe 104, for DL synchronization and UL synchronization. The DwPTS 110 is spaced from the UpPTS 114 by a Guard Period (GP) 112.

In the TD-SCDMA system, a transmitter transmits a 144-chip midamble sequence with period 128 in every TS and a receiver performs channel estimation using the midamble sequence. A midamble sequence allocated to each channel is generated by shifting a base midamble sequence by a predetermined shift value. This means that a midamble sequence having a predetermined midamble offset is allocated to each channel.

Figure 2:
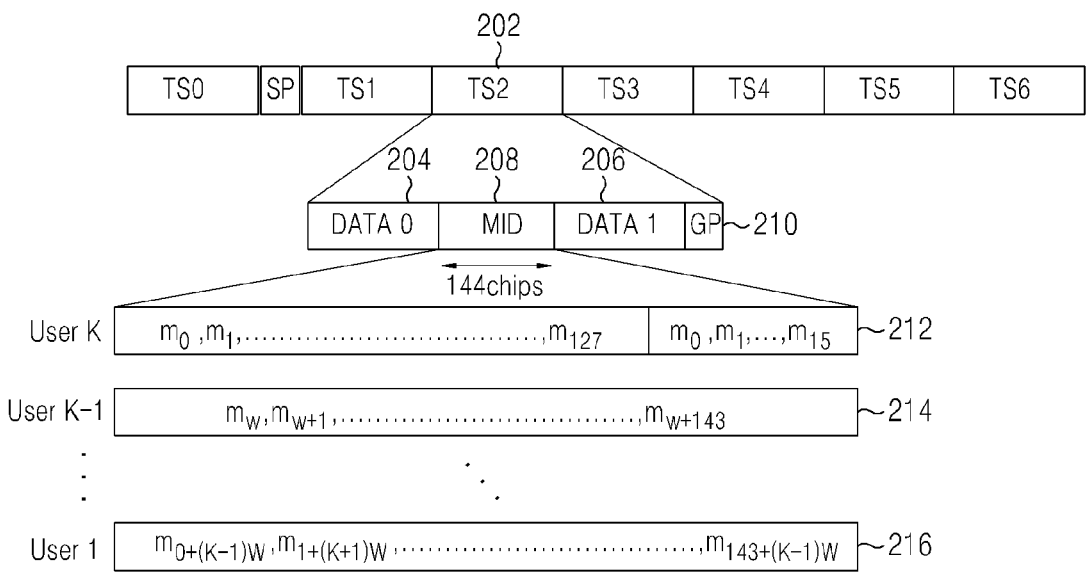
FIG. 2 illustrates generation of midamble sequences in a TD-SCDMA system according to an exemplary embodiment of the present invention.

FIG. 2 illustrates generation of midamble sequences in a TD-SCDMA system according to an exemplary embodiment of the present invention. In the illustrated case of FIG. 2, the midamble sequences are allocated to K users.

Referring to FIG. 2, a TS 202 includes two data fields 204 and 206 (DATA 0 and DATA 1), a midamble 208 (MID) interposed between the data fields 204 and 206, and a GP 210 at the end of the TS 202. The midamble 208 is a 144-chip sequence with a chip rate of 1.28 Mcps. If K users (or User Equipments (UEs)) are allocated to a current cell, K midamble sequences 212, 214 and 216 may be transmitted independently in the TS 202. The midamble sequences 212, 214 and 216 are generated by cyclically shifting a base midamble sequence by different midamble shift values. K is the maximum number of different midamble shift values in one cell.

In FIG. 2, the midamble sequence 212 allocated to user K is given as $m_0, m_1, \ldots, m_{127}, m_0, m_1, \ldots, m_{15}$, the midamble sequence 214 allocated to user K-1 is given as $m_W, m_{W+1}, \ldots, m_{W+143}$, and the midamble sequence 216 allocated to user 1 is given as $m_{0+(K-1)W}, m_{1+(K-1)W}, \ldots, m_{143+(K-1)W}$.

Herein, W represents the time differences between midamble sequences, namely time offsets, indicating the maximum number of multiple paths and the window size of each user. A midamble sequence of a BS is divided into $K_{Cell}$ windows and one or more sequences corresponding to one or more different windows are allocated to each user within a cell of the BS.

Because each midamble sequence is allocated to a different user, a midamble sequence is associated with a channelization code for data transmitted in the data fields of a TS.

Midamble sequences having different time offsets have a low cross-correlation between them. Thus, the midamble sequences may be used in distinguishing and estimating channels of different users. The TD-SCDMA system enables beamforming-based data transmission by allocating independent midamble sequences to users. Different midamble sequences may be allocated independently to different antennas in order to support Space Code Transmit Diversity (SCTD).

Each cell may or may not support beamforming according to the capabilities of a BS that covers the cell or an operator setting in the TD-SCDMA system. All users are covered in a single wide beam range within a cell that does not use beamforming. On the other hand, the same or different beams may be allocated to a plurality of users within a cell that uses beamforming. If different beams are allocated to a plurality of users, the users experience different channel environments.

Figure 3:
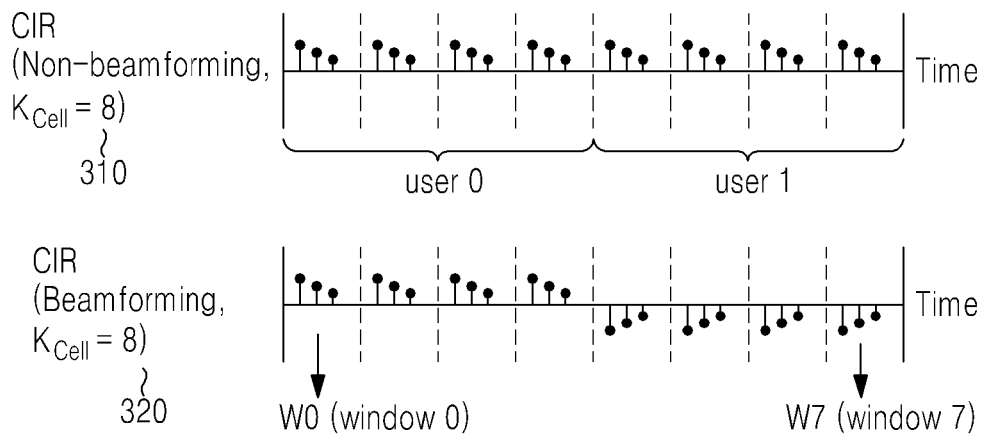
FIG. 3 illustrates channel estimation results of two users according to an exemplary embodiment of the present invention.

FIG. 3 illustrates channel estimation results of two users according to an exemplary embodiment of the present invention. The parameter $K_{Cell}$ indicating the maximum number of supported midamble sequences or windows is 8 and one or more midamble sequences may be allocated to each user.

Referring to FIG. 3, four midamble sequences are allocated to each of two users, user 0 and user 1. Specifically, midamble sequences W0, W1, W2, and W3 are allocated to user 0, whereas midamble sequences W4, W5, W6, and W7 are allocated to user 1. Reference numerals 310 and 320 denote Carrier to Interference Ratios (CIRs) resulting from channel estimation respectively in the case of non-beamforming for each user and in the case of beamforming for each user. As noted from FIG. 3, when beamforming is not used, the channel estimation results of the two users are similar, as indicated by reference numeral 310. On the other hand, when beamforming is used, which means that different beams are allocated to the two users, the channel estimation results of the users are different, as indicated by reference numeral 320.

Figure 4:
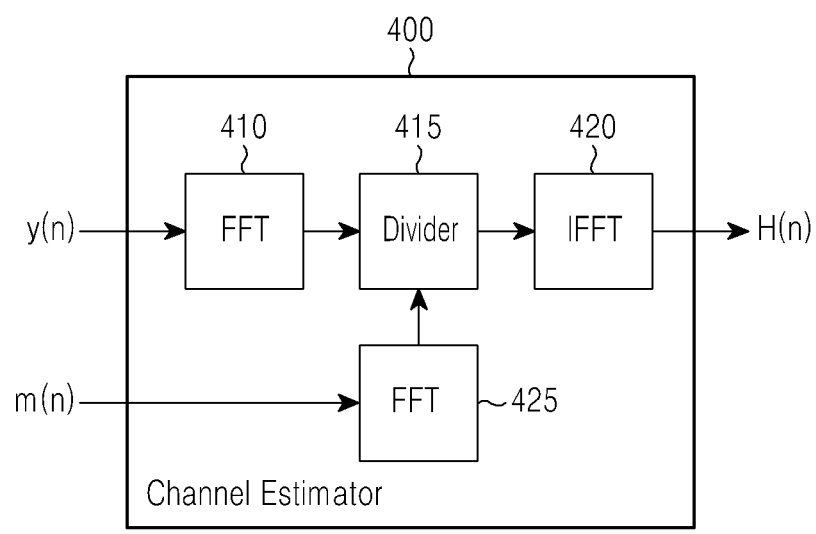
FIG. 4 is a block diagram of a channel estimator in a TD-SCDMA system according to an exemplary embodiment of the present invention.

FIG. 4 is a block diagram of a channel estimator in a TD-SCDMA system according to an exemplary embodiment of the present invention. In the example of FIG. 4, the channel estimator adopts a Steiner channel estimation scheme for a single cell.

Referring to FIG. 4, a channel estimator 400 includes a Fast Fourier Transform (FFT) processor that 410 performs FFT on a signal y(n) received through a Radio Frequency (RF) processor (not shown) and an Analog to Digital Converter (ADC) (not shown). An FFT processor 425 also performs FFT on a midamble sequence m(n) received from a BS. The received signal y(n) is a 128-chip signal except for a 16-chip GP in a 144-chip received signal. A UE receiver may use the 128-chip received signal as an input to the FFT processor 410 by oversampling the 128-chip signal in order to increase channel estimation performance. The 16-chip GP is removed to cancel interference caused by a previously received data field. The midamble sequence m(n) is a 128-chip midamble sequence of the BS.

A divider 415 divides the FFT result of the received signal y(n) by the FFT result of the midamble sequence m(n) and an Inverse FFT (IFFT) processor 420 generates a channel impulse response H(n) by IFFT-processing the output of the divider 415.

The channel impulse response H(n) includes channel impulse responses for all users. Therefore, a user extracts a channel impulse response corresponding to a window allocated to the user by an additional algorithm.

Figure 5:
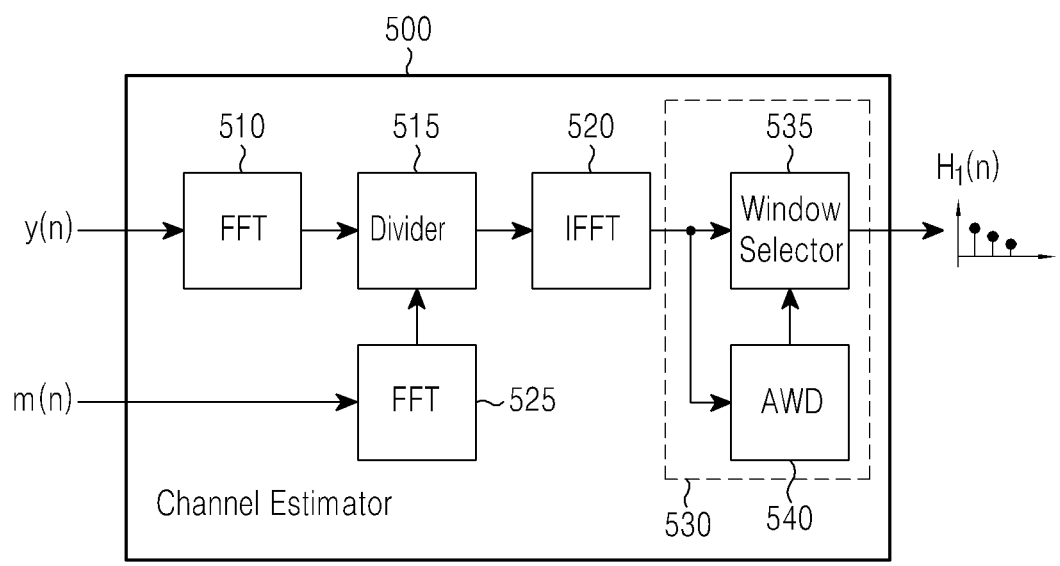
FIG. 5 is a block diagram of a channel estimator that additionally includes a window selection unit in a TD-SCDMA system according to an exemplary embodiment of the present invention.

FIG. 5 is a block diagram of a channel estimator that includes a window selection unit in a TD-SCDMA system according to an exemplary embodiment of the present invention.

Referring to FIG. 5, a channel estimator 500 includes an FFT processor 510 that performs FFT on a signal y(n) received through an RF processor (not shown) and an ADC (not shown). An FFT processor 525 also performs FFT on a midamble sequence m(n) received from a BS. A divider 515 divides the FFT result of the received signal y(n) by the FFT result of the midamble sequence m(n) and an IFFT processor 520 generates a channel impulse response H(n) by IFFT-processing the output of the divider 415. The channel impulse response H(n) is provided to a window selection unit 530 including a window selector 535 and an Active Window Detector (AWD) 540.

The AWD 540 performs an active window detection operation in a time period (i.e., a window) allocated to a user from among $K_{Cell}$ windows divided in time from the channel impulse response H(n). More specifically, the AWD 540 determines the power level of a channel response value in each window, compares the power level with a predetermined threshold, and detects the position of at least one window carrying a midamble sequence allocated to the user. The window selector 535 provides the channel response value of the at least one window detected by the AWD 540 to a Joint Detector (JD) (not shown). For example, if the at least one detected window is W1 and W2, the channel response values $h_1(n)$ and $h_2(n)$ of the windows W1 and W2 are provided to the JD. The JD eliminates interference components from other users using the channel response values of the user and the other users, thereby improving detection performance.

As described before, it is very important to increase the reliability of channel estimation in the TD-SCDMA system. When beamforming is not used, it may be assumed that users within a cell experience similar channels. Therefore, a channel estimator of each user may increase channel estimation performance by combining the channel response value of a window allocated to the user with the channel response values of windows allocated to other users.

However, if beamforming is used, different users experience different channel environments and thus their channel response values are not combined.

Figure 6:
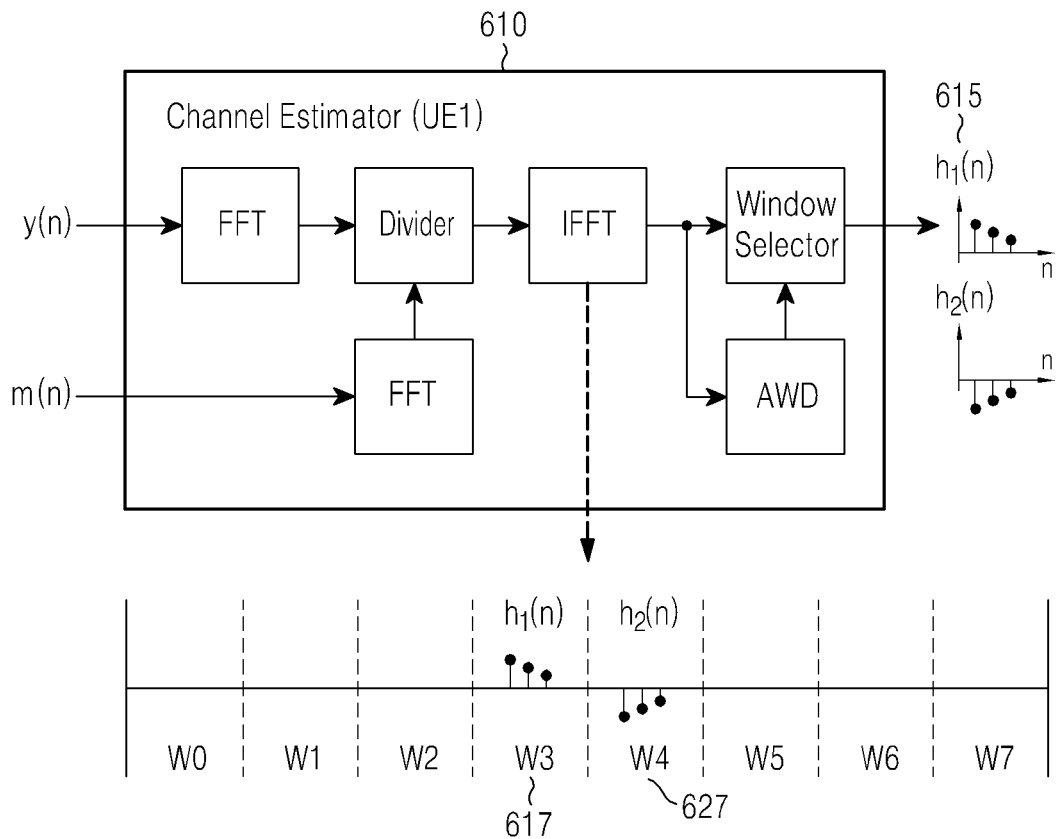
FIG. 6 illustrates channel estimation results in the case of beamforming according to an exemplary embodiment of the present invention.

FIG. 6 illustrates channel estimation results of a UE in the case of beamforming according to an exemplary embodiment of the present invention.

Referring to FIG. 6, a channel estimator 610 acquires channel response values 615 of windows 617 (W3) and 627 (W4) by channel estimation of a received signal y(n). If the power level of the channel response value of a window is larger than a predetermined threshold, an AWD detects the channel response value of the window and outputs the detected channel response value. Window information indicating a window allocated to the UE is signaled to the UE by higher-layer signaling. Thus, a window selector may identify the allocated window from among detected windows based on the window information. The window selector provides the channel response values $h_1(n)$ and $h_2(n)$ 615 of windows selected by the AWD to a JD at the next end. If the BS allocates different beams to different users by beamforming, the different channel response values $h_1(n)$ and $h_2(n)$ 615 are acquired for different users.

Although beamforming maximizes the reception performance of a user by focusing transmission energy toward the user, beamforming may not be supported in a real environment depending on BSs. The sum of transmission power levels remains constant during an entire time period in which midamble sequences are transmitted. Therefore, if the BS allocates midamble sequences to a plurality of users within its cell, the transmission power is divided for the individual midamble sequences by power control, resulting in as much performance degradation.

If the BS does not support beamforming, the UE may acquire channel response values of other users using midamble sequences allocated to the other users, thereby increasing channel estimation performance. However, a BS does not notify UEs within its cell of whether the BS supports beamforming in the TD-SCDMA system. Accordingly, a UE may determine whether a BS uses beamforming according to an exemplary embodiment of the present invention which will be described below.

Figure 7:
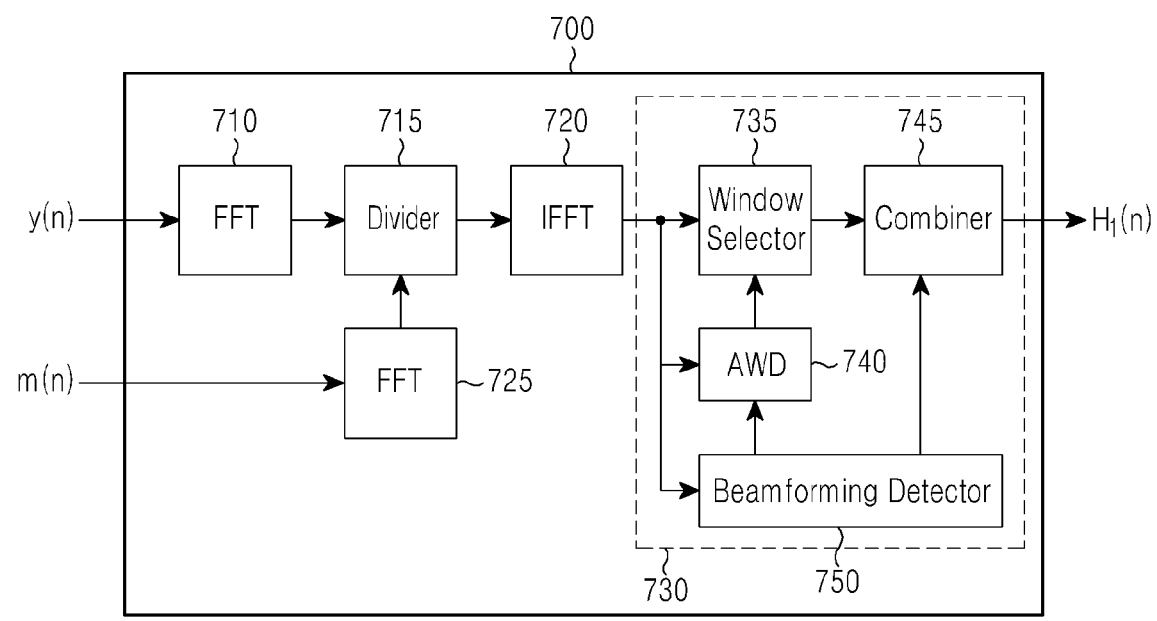
FIG. 7 is a block diagram of a channel estimator that determines whether beamforming is used in a User Equipment (UE) according to an exemplary embodiment of the present invention.

FIG. 7 is a block diagram of a channel estimator to determine whether beamforming is used in a UE according to an exemplary embodiment of the present invention.

Referring to FIG. 7, a channel estimator 700 includes an FFT processor 710 that performs FFT on a signal y(n) received through an RF processor (not shown) and an ADC (not shown). An FFT processor 725 also FFT-processes a midamble sequence m(n) received from a BS. A divider 715 divides the FFT result of the received signal y(n) by the FFT result of the midamble sequence m(n). An IFFT processor 720 generates a channel impulse response H(n) by IFFT-processing the output of the divider 715. The channel impulse response H(n) is provided to a window selection unit 730 including a window selector 735, an AWD 740, a beamforming detector 750, and a combiner 745.

The AWD 740 performs an active window detection operation in a time period (i.e., a window) allocated to the user from among $K_{Cell}$ windows divided in time from the channel impulse response H(n) based on window information received from the BS by higher-layer signaling. More specifically, the AWD 740 determines the power level of a channel response value in each window, compares the power level with a predetermined threshold, and detects the position of a window carrying a midamble sequence allocated to the UE. The window selector 735 selects the channel response value of a window based on the window information and the window position detected by the AWD 740 and provides the selected channel response value to the combiner 745.

Additionally, the window selector 735 may provide the channel response value of at least one window allocated to at least one other user to the combiner 745. For example, at least one channel response value having a power level equal to or larger than a predetermined threshold may be provided to the combiner 745. In another example, a predetermined number of high channel response values may be provided to the combiner 745. For example, the channel response values of a window allocated to the user (i.e., user 1) and a window allocated to another user (user 2) are h1(n) and h2(n), respectively.

The beamforming detector 750 determines whether the BS of the current cell uses beamforming by an algorithm in an exemplary embodiment of the present invention. More specifically, the beamforming detector 750 determines a cross-relation between the channel response values of the windows allocated to the user (i.e., user 1) and another user (i.e., user 2). If the cross-correlation is lower than a predetermined threshold, the beamforming detector 750 determines that the BS is likely to support beamforming. This beamforming detection operation is repeated across a plurality of TSs. If the number of TSs in which beamforming adaptation is detected during a latest predetermined time period is larger than a predetermined threshold, the UE may finally determine that the BS uses beamforming.

If determining that the BS does not use beamforming, the beamforming detector 750 notifies the combiner 745 that beamforming adaptation has not been detected. Then, the combiner 745 combines all available input channel response values and provides the combined channel response value as an improved channel response value of user 1 to a JD (not shown). For example, the combiner 745 combines the channel response values of user 1 and user 2 and provides the combined channel response value to the M. If the combiner 745 does not receive the notification that the BS uses beamforming, the combiner 745 outputs the channel response value of a window selected by the window selector 735 itself to the JD. The JD recovers an intended signal based on the received channel response value by a known joint detection algorithm.

While it has been described above that a single window is allocated to the user, if one or more windows are allocated to the user, the combiner 745 may combine the channel response values of the windows allocated to the user irrespective of beamforming or non-beamforming of the BS. If the BS uses beamforming, the combined channel response value is provided together with the channel response value of a window allocated to another user to the JD. On the other hand, if the BS does not use beamforming, the combined channel response value is combined with the channel response value of a window allocated to at least one other user and then provided to the JD.

The sequence of the operations of the combiner 745 is summarized as follows. The power level of a window refers to the power level of a channel response value included in the window.

1. The total $P_{total}$ of windows detected by the AWD is measured based on window information signaled by higher-layer signaling.
2. The square root $Sqrt(P_{win}/P_{total})$ of the value obtained by dividing the power $P_{win}$ of each window by the total power $P_{total}$ is calculated and then the channel response value of the window is normalized by multiplying the square root $Sqrt(P_{win}/P_{total})$ by the channel estimate of the window.
3. The normalized channel response values of the windows are summed (combined).
4. If the channel response sum is $h_{comb}(n)$ and a window includes m channels, the channel response value of the window is finally determined by determining $h_{comb}(n)/sqrt(m)$.

The number m of channels allocated to a window is determined by comparing an energy detected using each channelization code (e.g., Orthogonal Variable Spreading Factor (OVSF) code) of the window with a threshold. The maximum number of channelization codes that can be allocated to each window is determined by $K_{Cell}$. For example, if $K_{Cell}$ is 8, the maximum number of channels available to each window is $2\times(16/8)$.

Figure 8:
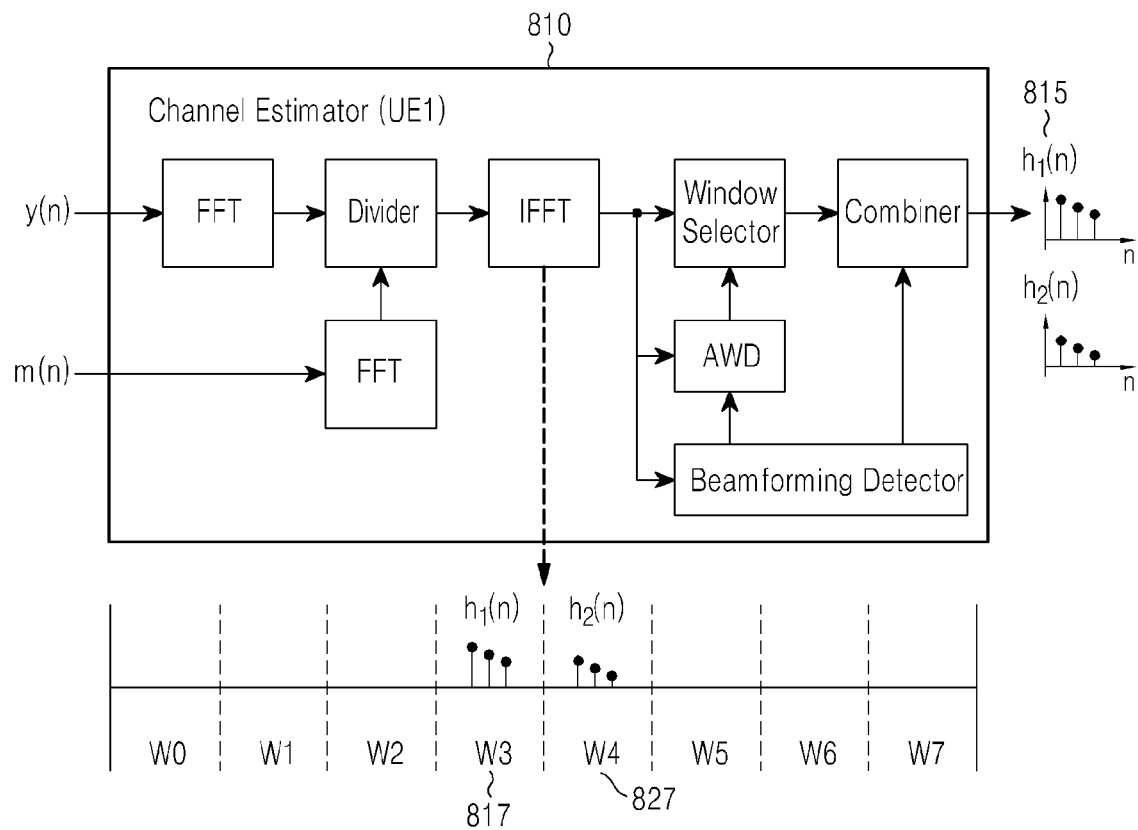
FIG. 8 illustrates channel estimation results in the case of non-beamforming according to an exemplary embodiment of the present invention.

FIG. 8 illustrates channel estimation results in the case of non-beamforming according to an exemplary embodiment of the present invention.

Referring to FIG. 8, a channel estimator 810 acquires the channel response value $h_1(n)$ of a window allocated to a user and the channel response value h₂(n) of a window allocated to another user, by channel estimation of a received signal y(n). The channel response values h₁(n) and h₂(n) 815 are acquired from windows W3 817 and W4 827, respectively. If the BS does not use beamforming, the channel response values h₁(n) and h₂(n) of the users have very similar channel characteristics.

A beamforming detector of the channel estimator 810 determines whether the BS supports beamforming based on the channel response values h₁(n) and h₂(n) 815 of the windows W3 817 and W4 827 and provides the determination result to a combiner.

If the BS supports beamforming, the channel estimator 810 operates in the same manner as described before with reference to FIG. 6. On the contrary, if beamforming adaptation is not detected, the channel characteristics of the windows of users have very similar characteristics. Accordingly, the channel estimator 810 combines the channel response values of the windows W3 817 and W4 827, thereby maximizing channel estimation performance.

Figure 9:
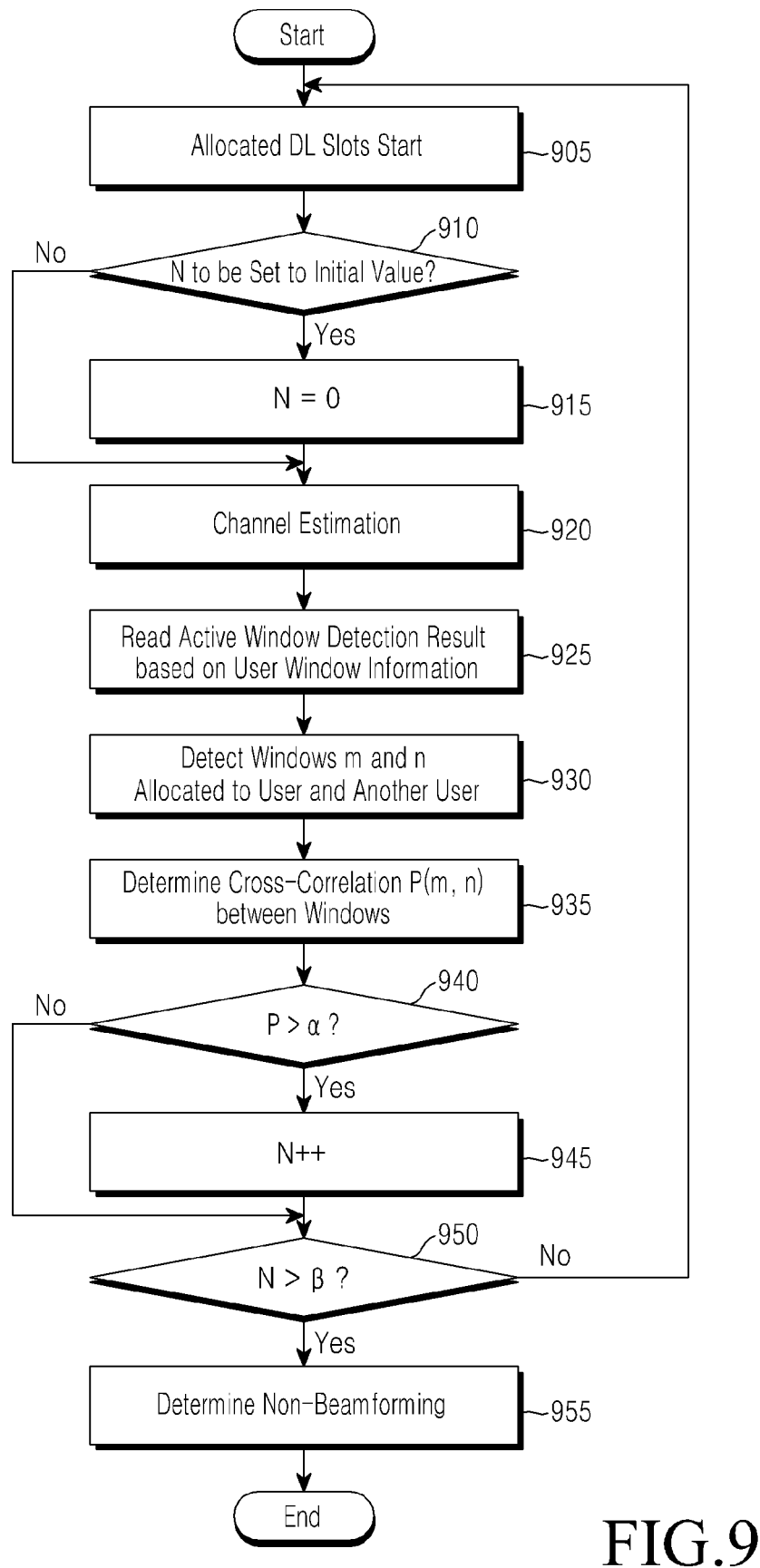
FIG. 9 is a flowchart illustrating a beamforming detection operation according to an exemplary embodiment of the present invention.

FIG. 9 is a flowchart illustrating a beamforming detection operation according to an exemplary embodiment of the present invention.

Referring to FIG. 9, the UE detects the start of allocated DL TSs according to a subframe configuration in step 905 and initializes a parameter N to count the number of TSs in which beamforming adaptation is not detected in step 910. The parameter N may be set to an initial value by determining whether a current TS is the start of a predetermined beamforming detection period. If the current slot is the start of the predetermined beamforming detection period, the UE sets the parameter N to the initial value in step 915 and otherwise, the UE maintains the parameter N at a current value and goes to step 920. In another exemplary embodiment of the present invention, if the UE determines that the BS supported beamforming in a previous TS or subframe, the UE may set the parameter N to the initial value in the current TS. In another exemplary embodiment of the present invention, the UE may determine to set the parameter N to the initial value if a beamforming detection operation needs to be initialized under a predetermined condition.

In step 920, the UE performs channel estimation on the current TS using a signal received from the BS and a known midamble sequence. The UE determines a channel response value of each window based on a channel response value of an entire midamble sequence acquired from the channel estimation by performing an active window detection operation based on user window information indicating the number of windows in step 925. More specifically, the beamforming detector may perform active window detection or read the channel response value of each window determined by a separately configured AWD. The BS signals the user window information to the UE by higher-layer signaling.

In step 930, the UE detects information about a window (e.g., window m) allocated to the UE and a window (e.g., window n) allocated to at least one other UE, indicated by the user window information. Then, the UE determines a cross-correlation P(m, n) between window m and window n using the channel response values $H_m$ and $H_n$ of window m and window n acquired by the active window detection in step 935. For example, the cross-correlation may be determined by Equation (1).

$$P(m, n) = \frac{|H_m \boxminus H_n^*|^2}{|H_m \boxminus H_m^*| \boxminus |H_n \boxminus H_n^*|}$$

Equation (1)

where m is the index of the window allocated to the user, n is the index of the window allocated to the one other user, $H_m$ is the estimated channel response value of window m, and $H_n$ is the estimated channel response value of window n.

The UE compares the cross-correlation P(m, n) with a predetermined threshold α in step 940. If the cross-correlation P(m, n) is larger than the threshold α, the UE increases the parameter N by 1 to count the number of TSs in which beamforming adaptation is not detected in step 945.

The UE compares the parameter N with a predetermined threshold β in step 950. If the parameter N is larger than the threshold β, the UE determines that the BS of the current cell does not support beamforming in step 955. On the contrary, if the parameter N is equal to or less than the threshold β, the UE returns to step 905 to proceed to the next TS. The UE considers that the BS supports beamforming until before the UE determines that the BS does not support beamforming in step 950.

If determining that the BS of the current cell does not support beamforming, the UE improves channel estimation performance by combining the channel response value of its user with the channel response value of the one other user. If determining that the BS of the current cell supports beamforming, the UE discontinues combining the channel response values of the user and the one other user and simply provides the channel response values of the user and the one other user to the JD.

In an alternative exemplary embodiment, the UE may store beamforming information about each BS, indicating whether the BS uses beamforming. When the UE performs channel estimation for a BS to cancel interference from other BSs, the UE may use the stored beamforming information.

As is apparent from the above description of exemplary embodiments of the present invention, since a UE can determine whether a BS supports beamforming, the channel estimation performance of the UE is maximized. If the BS does not support beamforming, the UE may additionally use the channel estimation result of a midamble sequence allocated to another UE, thereby increasing the reliability of channel estimation.

At this point it should be noted that exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A channel estimation method in a wireless communication system, the method comprising:
   determining a channel response value of a midamble sequence included in a downlink slot;
   detecting a first channel response value of a window allocated to a user and a second channel response value of a window allocated to at least one other user based on the channel response value of the midamble sequence;
   determining whether a Base Station (BS) of a current cell uses beamforming based on the first and second channel response values; and
   combining the first and second channel response values and using the combined channel response value for signal detection if it is determined that the BS does not use beamforming.

2. The method of claim 1, wherein the determining of whether the BS of the current cell uses beamforming comprises:
   determining a current slot as a non-beamformed slot if a cross-correlation between the first and second channel response values is larger than a predetermined first threshold;
   determining that the BS does not use beamforming if the number of slots determined as non-beamformed slots during a predetermined latest time period is larger than a predetermined second threshold; and
   determining that the BS uses beamforming if the number of slots determined as non-beamformed slots is equal to or less than the second threshold.

3. The method of claim 2, wherein the number of slots determined as non-beamformed slots is set to an initial value at the start of a predetermined beamforming detection period or when it is determined that the BS does not use beamforming.

4. The method of claim 2, wherein the cross-correlation between the first and second channel response values is determined using the following equation:

$$P(m, n) = \frac{|H_m \mathbb{E} H_n^*|^2}{|H_m \mathbb{E} H_m^*| \mathbb{E} |H_n \mathbb{E} H_n^*|},$$

where m is an index of a window associated with the first channel response value, n is an index of a window associated with the second channel response value, $H_m$ is the estimated channel response value of window m, and $H_n$, is the estimated channel response value of window n.

5. The method of claim 1, wherein the detection comprises detecting the first and second channel response values based on window information signaled by the BS.

6. The method of claim 1, wherein the determining of whether the BS of the current cell uses beamforming comprising:
   calculating a cross-correlation between the first and second channel response values;
   increasing a parameter indicating the number of non-beamformed slots by 1 if the cross-correlation is larger than a predetermined first threshold;
   deciding that the BS of the current cell uses beamforming if the parameter is larger than a predetermined second threshold; and
   deciding that the BS does not use beamforming if the parameter is equal to or less than the second threshold.

7. The method of claim 6, wherein the parameter is set to an initial value at the start of a predetermined beamforming detection period or if it is determined that the BS does not use beamforming.

8. The method of claim 6, wherein the cross-correlation between the first and second channel response values is determined using the following equation:

$$P(m, n) = \frac{|H_m \mathbb{E} H_n^*|^2}{|H_m \mathbb{E} H_m^*| \mathbb{E} |H_n \mathbb{E} H_n^*|}$$

where m is an index of a window associated with the first channel response value, n is an index of a window associated with the second channel response value, $H_m$ is the estimated channel response value of window m, and $H_n$ is the estimated channel response value of window n.

9. A channel estimation apparatus in a wireless communication system, the apparatus comprising:
   a channel estimator configured to determine a channel response value of a midamble sequence included in a downlink slot;
   a window detector configured to detect a first channel response value of a window allocated to a user and a second channel response value of a window allocated to at least one other user based on the channel response value of the midamble sequence;
   a beamforming detector configured to determine whether a Base Station (BS) of a current cell uses beamforming based on the first and second channel response values; and
   a combiner configured to combine the first and second channel response values and use the combined channel response value for signal detection if it is determined that the BS does not use beamforming.

10. The apparatus of claim 9, wherein the beamforming detector determines a current slot as a non-beamformed slot if a cross-correlation between the first and second channel response values is larger than a predetermined first threshold, determines that the BS does not use beamforming if the number of slots determined as non-beamformed slots during a predetermined latest time period is larger than a predetermined second threshold, and determines that the BS uses beamforming if the number of slots determined as non-beamformed slots is equal to or less than the second threshold.

11. The apparatus of claim 10, wherein the number of slots determined as non-beamformed slots is set to an initial value at the start of a predetermined beamforming detection period or when it is determined that the BS does not use beamforming.

12. The apparatus of claim 10, wherein the beamforming detector determines the cross-correlation between the first and second channel response values using the following equation:

$$P(m, n) = \frac{|H_m \mathrel{\text{E}} H_n^*|^2}{|H_m \mathrel{\text{E}} H_m^*| \mathrel{\text{E}} |H_n \mathrel{\text{E}} H_n^*|},$$

where m is an index of a window associated with the first channel response value, n is an index of a window associated with the second channel response value, $H_m$ is the estimated channel response value of window m, and $H_n$ is the estimated channel response value of window n.

13. The apparatus of claim 9, wherein the window detector detects the first and second channel response values based on window information signaled by the BS.

14. The apparatus of claim 9, wherein the beamforming detector is further configured to:
   calculate a cross-correlation between the first and second channel response values,
   increase a parameter indicating the number of non-beamformed slots by 1 if the cross-correlation is larger than a predetermined first threshold,
   decide that the BS of the current cell uses beamforming if the parameter is larger than a predetermined second threshold, and
   decide that the BS does not use beamforming if the parameter is equal to or less than the second threshold.

15. The apparatus of claim 14, wherein the parameter is set to an initial value at the start of a predetermined beamforming detection period or if it is determined that the BS does not use beamforming.

16. The apparatus of claim 14, wherein the beamforming detector determines the cross-correlation between the first and second channel response values using the following equation:

$$P(m, n) = \frac{|H_m \mathrel{\text{E}} H_n^*|^2}{|H_m \mathrel{\text{E}} H_m^*| \mathrel{\text{E}} |H_n \mathrel{\text{E}} H_n^*|},$$

where m is an index of a window associated with the first channel response value, n is an index of a window associated with the second channel response value, $H_m$ is the estimated channel response value of window m, and $H_n$ is the estimated channel response value of window n.

\* \* \* \* \*